(12) United States Patent
Liao

(10) Patent No.: US 11,256,143 B2
(45) Date of Patent: Feb. 22, 2022

(54) LIQUID CRYSTAL DISPLAY PANEL AND MANUFACTURING METHOD THEREOF

(71) Applicant: TCL China Star Optoelectronics Technology Co., Ltd., Shenzhen (CN)

(72) Inventor: Dong Liao, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 253 days.

(21) Appl. No.: 16/627,817

(22) PCT Filed: Dec. 19, 2019

(86) PCT No.: PCT/CN2019/126616
§ 371 (c)(1),
(2) Date: Dec. 31, 2019

(87) PCT Pub. No.: WO2021/103216
PCT Pub. Date: Jun. 3, 2021

(65) Prior Publication Data
US 2021/0333589 A1    Oct. 28, 2021

(30) Foreign Application Priority Data

Nov. 27, 2019   (CN) .......................... 201911181371.3

(51) Int. Cl.
*G02F 1/1339*    (2006.01)
(52) U.S. Cl.
CPC ................... *G02F 1/1339* (2013.01)

(58) Field of Classification Search
CPC ..................................................... G02F 1/1339
See application file for complete search history.

(56) References Cited

U.S. PATENT DOCUMENTS

| | | | |
|---|---|---|---|
| 2016/0246106 A1* | 8/2016 | Ma | G02F 1/133512 |
| 2018/0203290 A1* | 7/2018 | Qiu | G06F 3/0412 |
| 2018/0207589 A1 | 7/2018 | Martinez | |
| 2019/0271867 A1 | 9/2019 | Tsuchiya et al. | |
| 2020/0209677 A1 | 7/2020 | Yin | |

FOREIGN PATENT DOCUMENTS

| | | |
|---|---|---|
| CN | 105785667 | 7/2016 |
| CN | 107921373 | 4/2018 |
| CN | 109116637 | 1/2019 |
| CN | 109375430 | 2/2019 |
| CN | 109946883 | 6/2019 |

* cited by examiner

*Primary Examiner* — Edmond C Lau

(57) ABSTRACT

The present invention provides a liquid crystal display panel and a manufacturing method thereof. By mixing a spacer particle composite in a sealant, wherein temperature-responsive polymer vesicles comprise temperature-responsive polymer bodies and free radical inhibitors encapsulated by the temperature-responsive polymer bodies, and the temperature-responsive polymer vesicles release the free radical inhibitors at a default temperature, thereby preventing orientation dark lines or uneven peripheral brightnesses when the liquid crystal display panel displays.

18 Claims, 3 Drawing Sheets

LIQUID CRYSTAL DISPLAY PANEL AND MANUFACTURING METHOD THEREOF

RELATED APPLICATIONS

This application is a National Phase of PCT Patent Application No. PCT/CN2019/126616 having International filing date of Dec. 19, 2019, which claims the benefit of priority of Chinese Patent Application No. 201911181371.3 filed on Nov. 27, 2019. The contents of the above applications are all incorporated by reference as if fully set forth herein in their entirety.

FIELD AND BACKGROUND OF THE INVENTION

The present invention relates to the field of display technologies, and in particular, to a liquid crystal display panel and a manufacturing method thereof.

For liquid crystal displays (LCDs), thin film transistor (TFT) array substrates and color filter (CF) substrates are bonded by sealant materials to prevent liquid crystals from overflowing the LCDs and prevent moisture from entering to the LCDs. However, as resolutions of the LCDs are getting higher and higher, frames of the LCDs are getting narrower and narrower, which leads to lower metal aperture ratios at locations of sealants. The low metal aperture ratios will cause insufficient curing when the coated sealants are cured. Insufficient curing of the sealants will cause photoinitiators having active free radicals to precipitate into the liquid crystals and initiate a polymerization of liquid crystal monomers, and the polymerization of the liquid crystal monomers will cause orientation dark lines or uneven peripheral brightnesses (Mura).

SUMMARY OF THE INVENTION

An objective of the present invention is to provide a liquid crystal display panel and a manufacturing method thereof, so as to solve problems that photoinitiators having active free radicals precipitate into liquid crystals and initiate a polymerization of liquid crystal monomers, which causing orientation dark lines or uneven peripheral brightnesses.

To achieve the above objective, the present invention provides a liquid crystal display panel. The liquid crystal display panel comprises a first substrate, a second substrate disposed opposite to the first substrate, a sealant disposed between the first substrate and the second substrate, and liquid crystal molecules disposed in a cavity surrounded by the first substrate, the second substrate, and the sealant; wherein temperature-responsive polymer vesicles are disposed within the sealant, the temperature-responsive polymer vesicles comprise temperature-responsive polymer bodies and free radical inhibitors encapsulated by the temperature-responsive polymer bodies, and the temperature-responsive polymer vesicles release the free radical inhibitors under a default temperature condition.

In the above-mentioned liquid crystal display panel, the liquid crystal display panel further comprises a plurality of spacer particles dispersed in the sealant, wherein each of the temperature-responsive polymer vesicles is disposed on a surface of one of the spacer particles.

In the above-mentioned liquid crystal display panel, a size of each of the spacer particles is 2 μm to 6 μm.

In the above-mentioned liquid crystal display panel, a mass ratio of the spacer particles to the sealant is (0.5~1.5):100.

In the above-mentioned liquid crystal display panel, the default temperature condition is a temperature higher than or equal to 55 degrees Celsius.

In the above-mentioned liquid crystal display panel, the temperature-responsive polymer vesicles comprise first temperature-responsive polymer vesicles and second temperature-responsive polymer vesicles, each of the first temperature-responsive polymer vesicles releases the free radical inhibitors at a temperature higher than a first threshold temperature, each of the second temperature-responsive polymer vesicles releases the free radical inhibitors at a temperature higher than a second threshold temperature, and the second threshold temperature is higher than the first threshold temperature.

In the above-mentioned liquid crystal display panel, the first threshold temperature is 55 degrees Celsius, and the second threshold temperature is 120 degrees Celsius.

In the above-mentioned liquid crystal display panel, a size of each of the temperature-responsive polymer vesicles is 10 nm to 500 nm.

In the above-mentioned liquid crystal display panel, a material of the sealant comprises a matrix resin, a photoinitiator, and a crosslinking agent.

In the above-mentioned liquid crystal display panel, a material of the temperature-responsive polymer bodies is polyoxyethylene-b-poly N-isopropylacrylamide, and the free radical inhibitors are made of a material selected from at least one of 2,6-di-tert-butyl-4-methylphenol and tetramethylpiperidine nitrogen oxide.

A manufacturing method of a liquid crystal display panel, comprising following steps of:

coating a mixture of an adhesive and a spacer particle composite on a first substrate to form a frame-shaped sealant, wherein the spacer particle composite comprises spacer particles and temperature-responsive polymer vesicles, each of the temperature-responsive polymer vesicles is disposed on a surface of one of the spacer particles, the temperature-responsive polymer vesicles comprise temperature-responsive polymer bodies and free radical inhibitors encapsulated by the temperature-responsive polymer bodies, the temperature-responsive polymer vesicles release the free radical inhibitors under a default temperature condition, and the adhesive comprise a matrix resin, a photoinitiator, and a crosslinking agent;

disposing a second substrate on the frame-shaped sealant to make the first substrate and the second substrate are disposed opposite with each other;

irradiating the frame-shaped sealant with ultraviolet; and heating the frame-shaped sealant after an irradiation of the ultraviolet to 80 degrees Celsius to 130 degrees Celsius.

In the above-mentioned manufacturing method of the liquid crystal display panel, a mass ratio of the spacer particles to the adhesive is (0.5~1.5):100.

In the above-mentioned manufacturing method of the liquid crystal display panel, an accumulated light of the ultraviolet is 1000 mJ to 6000 mJ.

In the above-mentioned manufacturing method of the liquid crystal display panel, heating the frame-shaped sealant after the irradiation of the ultraviolet to 120 degrees Celsius for a time of 50 minutes to 60 minutes.

In the above-mentioned manufacturing method of the liquid crystal display panel, the default temperature condition is a temperature higher than or equal to 55 degrees Celsius.

In the above-mentioned manufacturing method of the liquid crystal display panel, a size of each of the temperature-responsive polymer vesicles is 10 nm to 500 nm.

In the above-mentioned manufacturing method of the liquid crystal display panel, a size of each of the spacer particles is 2 μm to 6 μm.

In the above-mentioned manufacturing method of the liquid crystal display panel, a material of the temperature-responsive polymer bodies is polyoxyethylene-b-poly N-isopropylacrylamide, and the free radical inhibitors are made of a material selected from at least one of 2,6-di-tert-butyl-4-methylphenol and tetramethylpiperidine nitrogen oxide.

BENEFICIAL EFFECT

The present invention provides a liquid crystal display panel and a manufacturing method thereof. Temperature-responsive polymer vesicles are disposed within a sealant. The temperature-responsive polymer vesicles comprise temperature-responsive polymer bodies and free radical inhibitors encapsulated by the temperature-responsive polymer bodies. The temperature-responsive polymer vesicles release the free radical inhibitors under a default temperature condition to make the free radical inhibitors act on the active free radicals disposed in the sealant to prevent the active radicals from diffusing into liquid crystals and cause the liquid crystals to polymerize, thereby preventing orientation dark lines or uneven peripheral brightnesses when the liquid crystal display panel displays.

DESCRIPTION OF SPECIFIC EMBODIMENTS OF THE INVENTION

The technical solutions in the embodiments of the present invention will be clearly and completely described below with reference to the drawings in the embodiments of the present invention. Obviously, the described embodiments are only a part of the embodiments of the present invention, but not all the embodiments. Based on the embodiments in the present invention, all other embodiments obtained by those skilled in the art without creative work fall into the protection scope of the present invention.

Figure 1:
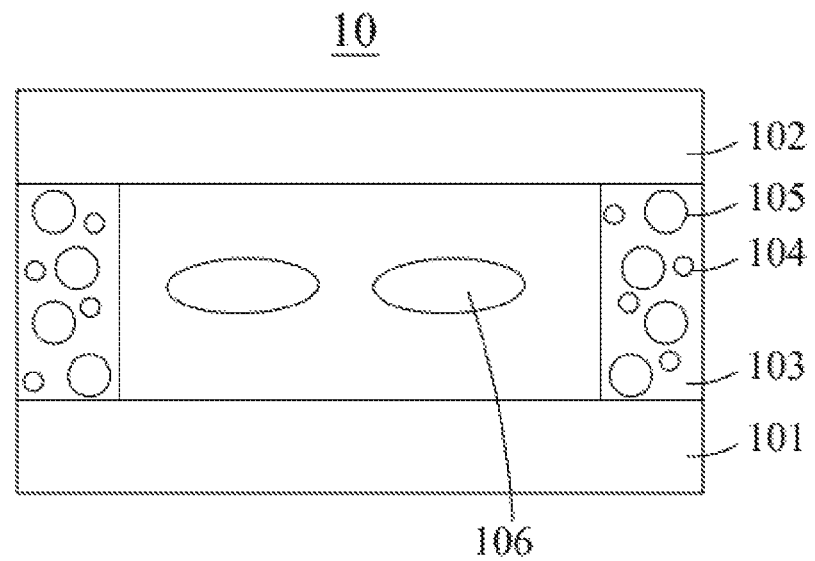
FIG. 1 is a schematic structural view of a liquid crystal display panel according to an embodiment of the present invention.
Figure 2:
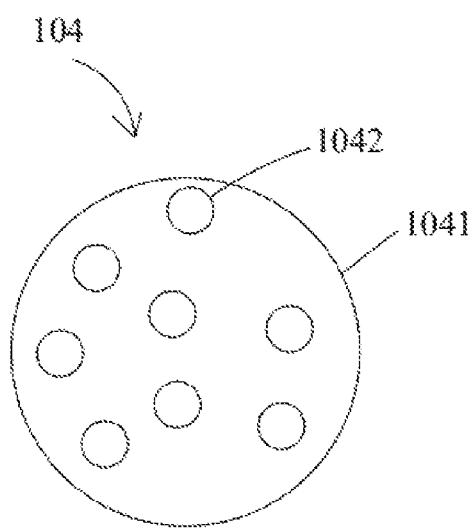
FIG. 2 is a schematic structural view of a temperature-responsive polymer vesicle in the liquid crystal display panel shown in FIG. 1.

Please refer to FIG. 1 and FIG. 2. FIG. 1 is a schematic structural view of a liquid crystal display panel according to an embodiment of the present invention. FIG. 2 is a schematic structural view of a temperature-responsive polymer vesicle in the liquid crystal display panel shown in FIG. 1. The liquid crystal display panel 10 may be one of a vertical alignment type liquid crystal display panel, a flat conversion type liquid crystal display panel, and a fringe field type liquid crystal display panel. The liquid crystal display panel 10 comprises a first substrate 101, a second substrate 102, a sealant 103, temperature-responsive polymer vesicles 104, a plurality of spacer particles 105, and liquid crystal molecules 106.

One of the first substrate 101 and the second substrate 102 is a thin film transistor array substrate, and the other is a color filter substrate. The second substrate 102 is disposed opposite to the first substrate 101. An alignment layer is provided on a surface of the first substrate 101 opposite to the second substrate 102, and an alignment layer is also provided on a surface of the second substrate 102 opposite to the first substrate 101. The alignment layer is used to make the liquid crystal molecules having a uniform and stable initial alignment state to prevent the liquid crystal molecules from generating domain faults under an action of voltage. It can be understood that protrusions for generating a pretilt angle of the liquid crystal molecules can also be provided on both the first substrate 101 and the second substrate 102.

The sealant 103 is used for bonding the first substrate 101 and the second substrate 102 to form a closed cavity, to prevent liquid crystals provided in the cavity from leaking, or to prevent water vapor from penetrating into the liquid crystal display panel. The sealant 103 is disposed between the first substrate 101 and the second substrate 102. A material of the sealant 103 comprises a matrix resin, a photoinitiator, and a crosslinking agent. The material of the sealant needs to be sequentially cured by ultraviolet and heat to obtain the sealant. During an ultraviolet curing process, the photoinitiator is decomposed into compounds having active radicals under an irradiation of ultraviolet. The compounds having active radicals initiate a radical polymerization of the matrix resin and are then heated to a default temperature to cause a crosslinking reaction between the crosslinking agent and the polymer to form a network crosslinked polymer. The matrix resin is acrylate and its derivatives. The crosslinking agent is epoxy resin. The photoinitiator is azobisisobutyronitrile.

The liquid crystal molecules 106 are disposed in the cavity surrounded by the first substrate 101, the second substrate 102, and the sealant 103. The liquid crystal molecules 106 may be thermotropic liquid crystals or lyotropic liquid crystals. The liquid crystal molecules 106 are deflected by a voltage greater than or equal to a threshold voltage. Light emitted by a backlight module (not shown) passes through polarizers on a light incident side of the liquid crystal display panel, the deflected liquid crystal molecules, and polarizers on a light exit side of the liquid crystal display panel in order to perform screen display.

The spacer particles 105 are used to support edges of the liquid crystal display panel. A plurality of spacer particles 105 are dispersed in the sealant 103. The spacer particles 105 are spherical or elliptical. A size of each of the spacer particles is 2 micrometers (μm) to 6 μm. The size of each of the spacer particles 105 is less than 2 μm, which will lead to poor support. The size of each of the spacer particles 105 is more than 6 μm, which will cause poor curing of the sealant. The size of each of the spacer particles can also be 3.6 μm to 6 μm. Specifically, the size of each of the spacer particles 105 can be 4 μm and 5 μm. A mass ratio of the spacer particles to the sealant is (0.5~1.5):100, which making the sealant 103 and the spacer particles 105 have a proper ratio, to ensure that the sealant 103 is cured well to function as a seal and an adhesive, and the spacer particles 105 play a good supporting role. Specifically, the mass ratio of the spacer particles 105 to the sealant 103 is 1:100. A material of the spacer particles 105 is polysiloxane, so that the spacer particles have good flexibility while supporting.

As shown in FIG. 1 and FIG. 2, the temperature-responsive polymer vesicles 104 are disposed in the sealant 103. Each of the temperature-responsive polymer vesicles 104 comprises a temperature-responsive polymer body 1041 and free radical inhibitors 1042 encapsulated by the temperature-responsive polymer body 1041. The temperature-responsive polymer vesicles 104 release the free radical inhibitors 1042 under a default temperature condition. The temperature-responsive polymer bodies 1041 and the radical inhibitors 1042 are used as raw materials, and the temperature-responsive polymer vesicles 104 are formed by self-assembly in a solvent.

A size of each of the temperature-responsive polymer vesicles is 10 nm to 500 nm. The size of each of the temperature-responsive polymer vesicles may also be 20 nm to 200 nm. For example, the size of each of the temperature-responsive polymer vesicles 104 is 50 nm or 100 nm. The size of each of the temperature-responsive polymer vesicles 104 is less than 10 nm, which is not conducive to uniformly dispersing the temperature-responsive polymer vesicles 104 in the sealant 103 and preventing an aggregation phenomenon of the temperature-responsive polymer vesicles 104. The size of each of the temperature-responsive polymer vesicles 104 is greater than 500 nm, which is to prevent the size of each of the temperature-responsive polymer vesicles 104 from being too large, resulting in insufficient curing of the sealant. A material of each of the temperature-responsive polymer bodies is polyoxyethylene-b-poly N-isopropylacrylamide (PEO-b-PNIPAM), which causes the temperature-responsive polymer bodies 1041 encapsulate the free radical inhibitors when a temperature is lower than 60 degrees Celsius, and the temperature-responsive polymer bodies 1041 are thermally expanded to release the free-radical inhibitors when the temperature is higher than or equal to 60 degrees Celsius. The free radical inhibitors are made of a material selected from at least one of 2,6-di-tert-butyl-4-methylphenol and tetramethylpiperidine nitrogen oxide. The free radical inhibitors 1042 react with active free radicals to remove the active free radicals in the sealant, and prevents the reactive free radicals remaining in the sealant from diffusing into the liquid crystal molecules and causing the liquid crystal molecules to polymerize.

In the embodiment, the default temperature condition is a temperature higher than or equal to 55 degrees Celsius. In general, the sealant is obtained by irradiating the adhesive with the ultraviolet. A chemical reaction of the adhesive under the action of ultraviolet will exotherm. The inventor has found through a large number of experiments that a temperature of the adhesive is less than 50 degrees Celsius when the adhesive is cured by the ultraviolet. The default temperature is higher than or equal to 55 degrees Celsius, which can prevent the free radical inhibitors from reacting with the active free radicals generated by the photoinitiators during the ultraviolet curing of the adhesive, so as to prevent the free radical inhibitors from affecting the adhesive in the ultraviolet curing under irradiation.

Further, the temperature-responsive polymer vesicles 104 comprise first temperature-responsive polymer vesicles and second temperature-responsive polymer vesicles, each of the first temperature-responsive polymer vesicles releases the free radical inhibitors at a temperature higher than a first threshold temperature, each of the second temperature-responsive polymer vesicles releases the free radical inhibitors at a temperature higher than a second threshold temperature, and the second threshold temperature is higher than the first threshold temperature.

Specifically, the first temperature-responsive polymer vesicles are used to release the free radical inhibitors when the adhesive is thermally cured, so as to react with the remaining active free radicals of the adhesive after the ultraviolet curing, thereby preventing residual active free radicals after curing of the sealant, preventing residual active radicals from diffusing into the liquid crystals and contaminating the liquid crystals, and preventing the polymerization of liquid crystal molecules to affect the display effect of the liquid crystal display panel. That is, the residual active radicals are removed directly after the ultraviolet curing of the adhesive initiated by the active radicals decomposed by the photoinitiators, and thus to prevent the diffusion of residual active radicals. The first threshold temperature is 55 degrees Celsius. The second temperature-responsive polymer vesicles are used to react with the active free radicals generated in the sealant 103 during the test (such as reliability test) and use of the liquid crystal display panel to prevent the performance of the sealant 103 from deteriorating, and avoid active radical diffusion in the sealant 103. The second threshold temperature is 120 degrees Celsius.

Figure 3:
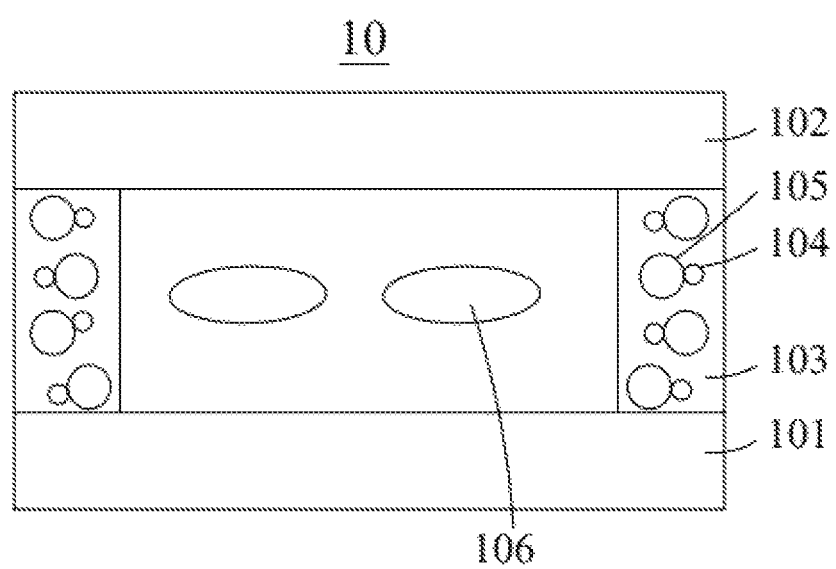
FIG. 3 is a schematic structural view of a liquid crystal display panel according to another embodiment of the present invention.

Please refer to FIG. 3, which is a schematic structural view of the liquid crystal display panel according to another embodiment of the present invention. The liquid crystal display panel 10 shown in FIG. 3 is basically similar to the liquid crystal display panel 10 shown in FIG. 1, except that the temperature-responsive polymer vesicles 104 are disposed on a surface of each of the spacer particles 105, and the temperature-responsive polymer vesicles 104 can connected to the surface of each of the spacer particles 105 by chemical bonds. The chemical bond may be an ester bond or an amide bond formed by a condensation reaction. The temperature-responsive polymer vesicles 104 can also be connected to the surface of the spacer particles 104 by intermolecular forces. For example, by forming a hydrogen bonding force between the spacer particles 105 and the temperature-responsive polymer vesicles 104. A mass ratio of a mass of each of the spacer particles 105 to a mass of the free radical inhibitor encapsulated by the temperature-responsive polymer vesicles 104 on the surface of each of the spacer particles 105 is 100:(0.01~1).

Compared with the liquid crystal display panel 10 shown in FIG. 1, the liquid crystal display panel 10 shown in FIG. 2 comprises the temperature-responsive polymer vesicles 104 disposed on the surface of the spacer particles 105. The spacer particles 105 can be evenly dispersed in the sealant 103, so that the temperature-responsive polymer vesicles 104 are uniformly dispersed in the sealant 103, thereby preventing uneven dispersion of temperature-responsive polymer vesicles 104 and can only inhibit local free radical inhibitors in the sealant 103. In addition, the temperature-responsive polymer vesicles 104 are disposed on the surface of the spacer particles 103, which can prevent the temperature-responsive polymer vesicles 104 from migrating into the liquid crystal molecules 106, and avoid the temperature-responsive polymer vesicles 104 from contaminating the liquid crystal molecules 106.

Figure 4:
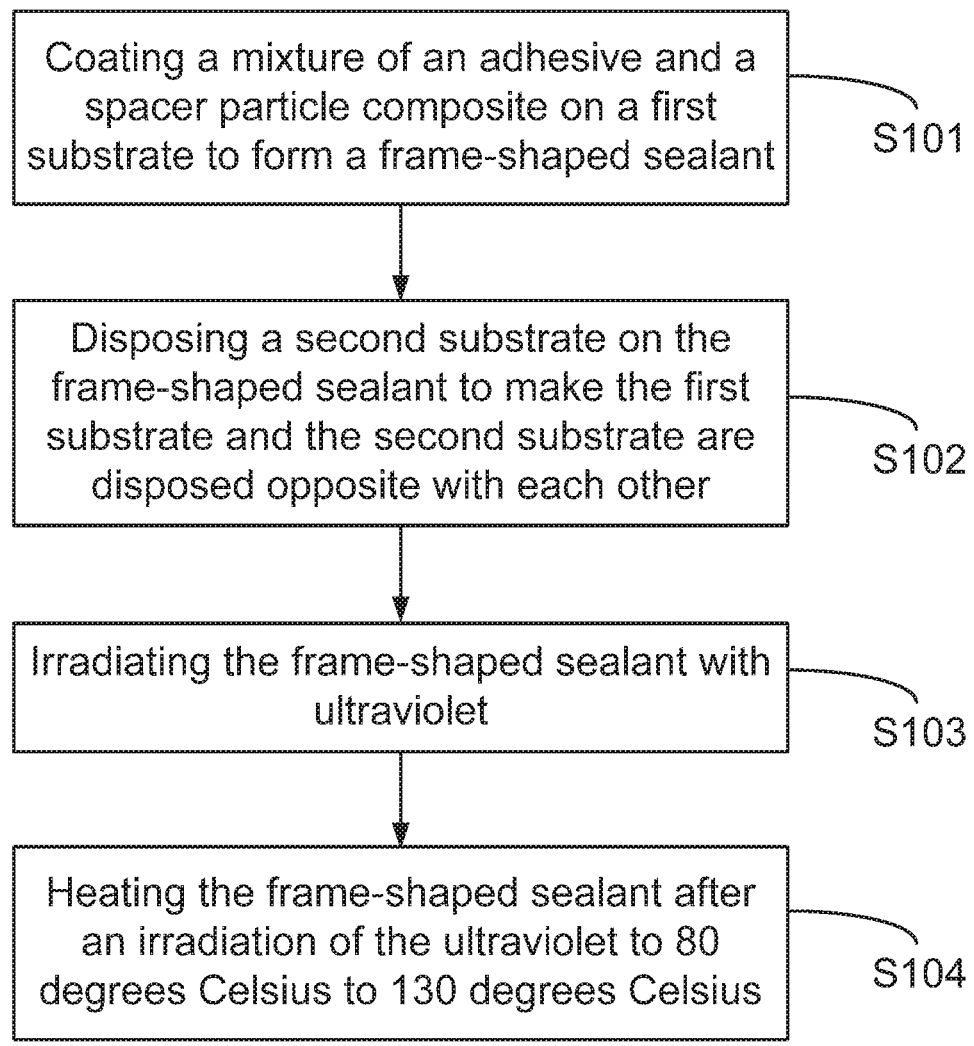
FIG. 4 is a flowchart of manufacturing the liquid crystal display panel according to the embodiment of the present invention.

Please refer to FIG. 4, which is a flowchart of manufacturing the liquid crystal display panel according to an embodiment of the present invention. The manufacturing method of the liquid crystal display panel comprises following steps of:

S101: coating a mixture of an adhesive and a spacer particle composite on a first substrate to form a frame-shaped sealant.

The adhesive and the spacer particle composite are mixed to obtain the mixture of the adhesive and the spacer particle composite, and then the mixture of the adhesive and the spacer particle composite is coated on the first substrate to form the frame-shaped sealant. The first substrate is one of a thin film transistor array substrate or a color filter substrate. The spacer particle composite comprises spacer particles and temperature-responsive polymer vesicles, and each of the temperature-responsive polymer vesicles is disposed on a surface of one of the spacer particles. The temperature-responsive polymer vesicles comprise temperature-responsive polymer bodies and free radical inhibitors encapsulated by the temperature-responsive polymer bodies. The temperature-responsive polymer vesicles release the free radical inhibitors under a default temperature condition. The adhesive comprises a matrix resin, a photoinitiator, and a cross-linking agent. A mass ratio of the spacer particles 105 to the adhesive is (0.5~1.5):100. Specifically, the mass ratio of the spacer particles to the adhesive is about 1:100. A mass ratio of a mass of each spacer particle to a mass of the free radical inhibitor encapsulated by the temperature-responsive polymer vesicles on the surface of each spacer particle is 100:(0.01~1).

S102: disposing a second substrate on the frame-shaped sealant to make the first substrate and the second substrate are disposed opposite with each other.

Specifically, before disposing the second substrate on the frame-shaped sealant, the liquid crystal molecules are coated on the first substrate on which the frame-shaped sealant is formed, and then the second substrate is disposed on the first substrate and compression-bonded, so that the first substrate and the second substrate are disposed opposite with each other. The second substrate is the other of the thin film transistor array substrate and the color filter substrate. A distance between the first substrate and the second substrate is 3.2 μm to 3.5 μm.

S103: irradiating the frame-shaped sealant with ultraviolet.

Specifically, during the ultraviolet curing of the frame-shaped sealant, the ultraviolet is irradiated from the first substrate side or the second substrate side. An accumulated light of the ultraviolet is 1000 mJ to 6000 mJ. Under the ultraviolet irradiation, the photoinitiators decompose to generate active radicals, and the active radicals initiate the polymerization of the matrix resin to form a linear polymer.

S104: heating the frame-shaped sealant after an irradiation of the ultraviolet to 80 degrees Celsius to 130 degrees Celsius.

Specifically, during the heat curing process of the frame-shaped sealant, the frame-shaped sealant is heated to 120 degrees Celsius for a period of 50 minutes to 60 minutes. A cross-linking agent reacts with an active functional group on the linear polymer to form a network-type cross-linked polymer, while the temperature-responsive polymer vesicles release free radicals to inhibit. The free radical inhibitors react with the active free radicals remaining during the ultraviolet curing process to prevent the frame-shaped sealant from diffusing into the liquid crystal molecules and curing the liquid crystal molecules after curing. At this time, the default temperature condition is a condition where a temperature is higher than or equal to 55 degrees Celsius.

The manufacturing method of the liquid crystal display panel of the embodiment of the present invention, by mixing the spacer particle composite in the sealant, wherein the spacer particle composite comprises the spacer particles and the temperature-responsive polymer vesicles disposed on the surface of the spacer particles, and the temperature-responsive polymer vesicles comprise the temperature-responsive polymer bodies and the free-radical inhibitors encapsulated by the temperature-responsive polymer bodies; wherein the temperature-responsive polymer vesicles release the free radical inhibitors at temperatures above 55 degrees Celsius, and after the adhesive is cured by the ultraviolet, the remaining residual active radicals will react with the free radical inhibitors when the sealant is thermally cured (the temperature is 80 degrees Celsius to 130 degrees Celsius), thereby the number of the residual active radicals is reduced, preventing the diffusion of the residual active radicals into the liquid crystals and causing the polymerization of the liquid crystal monomers, and preventing orientation dark lines or uneven peripheral brightnesses on the LCD display panel.

The descriptions of the above embodiments are only used to help understand the technical solution of this application and its core ideas. Those of ordinary skill in the art should understand that they can still modify the technical solutions described in the foregoing embodiments, or equivalently replace some of the technical features. These modifications or replacements do not depart from the scope of the technical solutions of the embodiments of the present application.

What is claimed is:

1. A liquid crystal display panel, comprising:
a first substrate, a second substrate disposed opposite to the first substrate, a sealant disposed between the first substrate and the second substrate, and liquid crystal molecules disposed in a cavity surrounded by the first substrate, the second substrate, and the sealant;
wherein temperature-responsive polymer vesicles are disposed within the sealant, the temperature-responsive polymer vesicles comprise temperature-responsive polymer bodies and free radical inhibitors encapsulated by the temperature-responsive polymer bodies, and the temperature-responsive polymer vesicles release the free radical inhibitors under a default temperature condition.

2. The liquid crystal display panel as claimed in claim 1, further comprising a plurality of spacer particles dispersed in the sealant, wherein each of the temperature-responsive polymer vesicles is disposed on a surface of one of the spacer particles.

3. The liquid crystal display panel as claimed in claim 2, wherein a size of each of the spacer particles is 2 μm to 6 μm.

4. The liquid crystal display panel as claimed in claim 2, wherein a mass ratio of the spacer particles to the sealant is (0.5~1.5):100.

5. The liquid crystal display panel as claimed in claim 1, wherein the default temperature condition is a temperature higher than or equal to 55 degrees Celsius.

6. The liquid crystal display panel as claimed in claim 1, wherein the temperature-responsive polymer vesicles comprise first temperature-responsive polymer vesicles and second temperature-responsive polymer vesicles, each of the first temperature-responsive polymer vesicles releases the free radical inhibitors at a temperature higher than a first threshold temperature, each of the second temperature-responsive polymer vesicles releases the free radical inhibitors at a temperature higher than a second threshold temperature, and the second threshold temperature is higher than the first threshold temperature.

7. The liquid crystal display panel as claimed in claim 6, wherein the first threshold temperature is 55 degrees Celsius, and the second threshold temperature is 120 degrees Celsius.

8. The liquid crystal display panel as claimed in claim 1, wherein a size of each of the temperature-responsive polymer vesicles is 10 nm to 500 nm.

9. The liquid crystal display panel as claimed in claim 1, wherein a material of the sealant comprises a matrix resin, a photoinitiator, and a crosslinking agent.

10. The liquid crystal display panel as claimed in claim 1, wherein a material of the temperature-responsive polymer bodies is polyoxyethylene-b-poly N-isopropylacrylamide, and the free radical inhibitors are made of a material selected from at least one of 2,6-di-tert-butyl-4-methylphenol and tetramethylpiperidine nitrogen oxide.

11. A manufacturing method of a liquid crystal display panel, comprising following steps of:
- coating a mixture of an adhesive and a spacer particle composite on a first substrate to form a frame-shaped sealant, wherein the spacer particle composite comprises spacer particles and temperature-responsive polymer vesicles, each of the temperature-responsive polymer vesicles is disposed on a surface of one of the spacer particles, the temperature-responsive polymer vesicles comprise temperature-responsive polymer bodies and free radical inhibitors encapsulated by the temperature-responsive polymer bodies, the temperature-responsive polymer vesicles release the free radical inhibitors under a default temperature condition, and the adhesive comprises a matrix resin, a photoinitiator, and a crosslinking agent;
- disposing a second substrate on the frame-shaped sealant to make the first substrate and the second substrate are disposed opposite with each other;
- irradiating the frame-shaped sealant with ultraviolet; and
- heating the frame-shaped sealant after an irradiation of the ultraviolet to 80 degrees Celsius to 130 degrees Celsius.

12. The manufacturing method of the liquid crystal display panel as claimed in claim 11, wherein a mass ratio of the spacer particles to the adhesive is (0.5~1.5):100.

13. The manufacturing method of the liquid crystal display panel as claimed in claim 11, wherein an accumulated light of the ultraviolet is 1000 mJ to 6000 mJ.

14. The manufacturing method of the liquid crystal display panel as claimed in claim 11, wherein heating the frame-shaped sealant after the irradiation of the ultraviolet to 120 degrees Celsius for a time of 50 minutes to 60 minutes.

15. The manufacturing method of the liquid crystal display panel as claimed in claim 11, wherein the default temperature condition is a temperature higher than or equal to 55 degrees Celsius.

16. The manufacturing method of the liquid crystal display panel as claimed in claim 11, wherein a size of each of the temperature-responsive polymer vesicles is 10 nm to 500 nm.

17. The manufacturing method of the liquid crystal display panel as claimed in claim 11, wherein a size of each of the spacer particles is 2 μm to 6 μm.

18. The manufacturing method of the liquid crystal display panel as claimed in claim 11, wherein a material of the temperature-responsive polymer bodies is polyoxyethylene-b-poly N-isopropylacrylamide, and the free radical inhibitors are made of a material selected from at least one of 2,6-di-tert-butyl-4-methylphenol and tetramethylpiperidine nitrogen oxide.

* * * * *